United States Patent [19]

Galloway et al.

[11] 4,271,865

[45] Jun. 9, 1981

[54] DRY BREAK COUPLING VALVE

[76] Inventors: Robert L. Galloway, 100 E. Columbus; Charles R. Galloway, 800 N. Taylor, both of Mount Ayr, Iowa 50854

[21] Appl. No.: 38,475

[22] Filed: May 14, 1979

[51] Int. Cl.³ .................. F16L 37/28; F16L 37/24
[52] U.S. Cl. .................. 137/614.06; 251/149.9; 251/89.5; 285/401
[58] Field of Search ............... 285/360, 361, 376, 396, 285/401, 402; 137/614, 614.06, 64.06; 251/149.9, 89.5

[56] References Cited

U.S. PATENT DOCUMENTS

| 346,438 | 7/1886 | Gillette et al. | 285/376 |
|---|---|---|---|
| 2,160,354 | 5/1939 | Evans | 285/73 |
| 2,422,070 | 6/1947 | Bettencourt | 138/89 |
| 2,819,028 | 1/1958 | Brezosky et al. | 285/361 |
| 3,106,223 | 10/1963 | Cooper | 137/614.01 |
| 3,168,125 | 2/1965 | Rosell | 137/614.06 |
| 3,216,744 | 11/1965 | Elbogen et al. | 251/89.5 |
| 3,254,673 | 6/1966 | MacKenzie | 137/614.06 |
| 3,295,553 | 1/1967 | Garrett et al. | 137/614.06 |
| 3,330,313 | 7/1967 | Rosell | 137/614.06 |
| 3,479,005 | 11/1969 | Graaf | 251/149.9 |
| 3,525,361 | 8/1970 | Gerbin | 137/614.04 |
| 3,818,939 | 6/1974 | Buseth | 137/614.06 |

FOREIGN PATENT DOCUMENTS

| 2504760 | 8/1975 | Fed. Rep. of Germany | 137/614.06 |
|---|---|---|---|
| 1094591 | 5/1955 | France | 137/614.06 |
| 1454948 | 8/1966 | France | 285/360 |
| 1416314 | 12/1975 | United Kingdom | 251/149.9 |

*Primary Examiner*—Martin P. Schwadron
*Assistant Examiner*—A. Michael Chambers
*Attorney, Agent, or Firm*—Zarley, McKee, Thomte, Voorhees & Sease

[57] ABSTRACT

A dry break coupling for connecting a pair of fluid conduits includes first and second housings adapted for connection to the respective conduits. The first housing includes a piston supported for axial sliding movement between a first position wherein fluid flow through the first housing is blocked and a second position wherein fluid is free to flow through the first housing. The second housing includes a poppet supported for axial movement between a first position wherein fluid flow through the second housing is blocked and a second position wherein fluid is free to flow through the second housing. A handle is provided on the first housing for moving the piston between the first and second positions therefor and the poppet is engaged by the piston and moved to its second position in response to axial movement of the piston from the first to the second position therefor. The housings are coupled together by a coacting pin and slot connection including an axially extended pin on one housing, a circumferentially extended slot on the other housing, and portions for axially securing the housings in axial engagement in response to circumferential movement of the pin in the slot. The piston is generally cylindrical in shape having a closed outer end and a plurality of openings through its peripheral surface adjacent its outer end for fluid flow through the openings and piston when the piston is in the second position therefor. First and second stop means are provided for axially retaining the piston and poppet in the first positions therefor. The stop means are disengageable in response to pivotal movement between the housings as they are connected. The invention also includes a device for alternately locking the handle of the first housing in positions corresponding to the first and second position of the piston and a cap adapted to be locked onto the second housing when the housings are disconnected.

12 Claims, 10 Drawing Figures

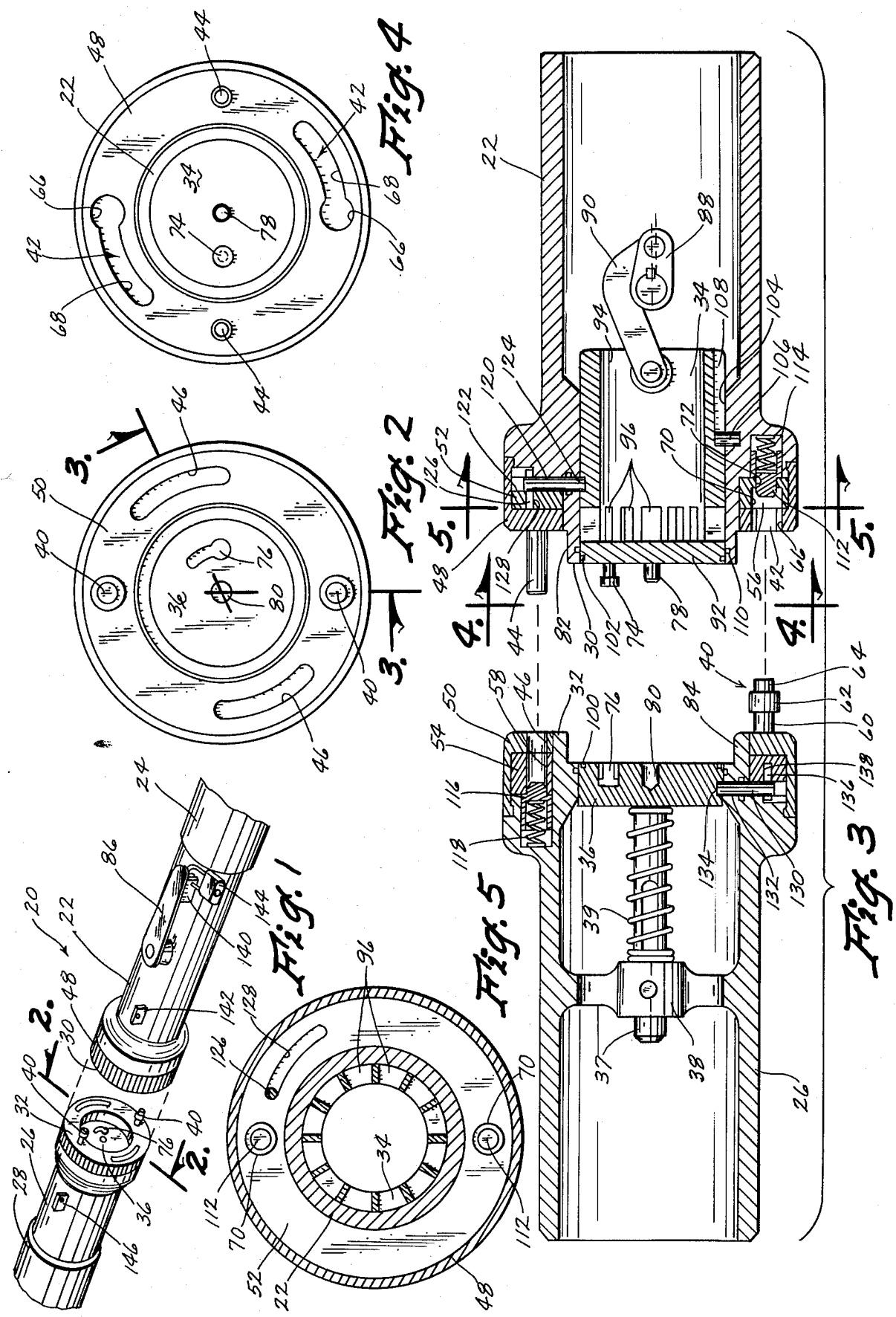

DRY BREAK COUPLING VALVE

BACKGROUND OF THE INVENTION

The present invention is directed generally to couplings for fluid conduits and more particularly to a dry break apparatus for coupling together and uncoupling a pair of fluid conduits with no loss of fluid therefrom.

Dry break valve couplings are known in the art but certain problems remain unresolved with such known couplings. First, the known couplings do provide leakage of up to a teaspoon or more of fluid when the coupling is engaged and disengaged. Although the fluid loss may be insignificant, the damage done by such leakage may be quite significant when hazardous materials are being handled such as certain fertilizers in agricultural applications. Leakage is generally caused by the fact that the fluid flow between the housings of the couplings contacts the joint between the housings, thereby leaving a residue on the housing end portions upon disconnection. The same problem occurs at the joint or engagement surfaces of the piston and poppet within the respective housings.

Another problem with known dry bleak couplings is that the poppet and piston valve elements of the respective housings cannot be locked in their closed positions when the housings are disengaged. Accordingly, both housings are susceptible to accidental opening of the valve therein which may result in the spillage of hazardous material onto adjacent persons or surroundings.

Finally, a serious problem with known dry break fluid couplings is that the connection between the housings of all couplings of one manufacturer are uniform so that one housing of a given coupling may be alternately connected to the opposite housing of any similar coupling. Accordingly, the supply hose of a tank truck intended for handling a certain fluid may be accidentally coupled to the valve housing on a storage tank for a different fluid. Thus the result may be either the transfer of the wrong fluid or the loss of fluid due to mixing of incompatible fluids.

The above-described problems are resolved by the dry break coupling of the present invention.

SUMMARY OF THE INVENTION

The dry break coupling of the present invention includes first and second housings adapted for a coded connection to one another. This is accomplished by a pin and slot connection including an axially extended pin on one housing and a circumferentially extended slot on the other housing and means for axially securing the housings together in response to circumferential movement of the pin within the slot. The pin may be provided with a stem portion, head portion and extension portion adapted for receipt respectively into the tail portion, external and internal portions of the slot. Infinite possibilities are thus provided for coding the housings of the couplings to one another such as by varying the depth, width or shape of the pin and slot portions as well as the relative radial and circumferential positions of the pins and slots on the housings. A coded pin and slot connection may be provided on the piston and poppet elements of the respective housings for a still further coded connection between the housings. It is evident that the possibilities for variance are great enough that the variation may be visually apparent so that further identification on the housings may be unnecessary.

To prevent accidental opening of the valves of the housings when the housings are disconnected, the present invention provides stop pins which are automatically engaged to lock the piston and poppet in their closed positions when the valve housings are disconnected. The stop pins are automatically disengaged in response to connection of the matched housings. For still further protection, brackets are provided for locking the piston adjustment handle in positions corresponding to both the open and closed position of the piston. The poppet housing may be locked also by a cap which can be fitted onto the open end of the housing and padlocked in position.

Finally, the housings of the dry break coupling may be uncoupled with no leakage of fluid or residue remaining on the separated housings. The cylindrical shaped piston having a closed outer end and peripheral openings adjacent the outer end provides for fluid flow through the piston and openings. Thus the cylindrical body of the piston covers and shields the joint between the housings from the fluid flowing between them. In addition, a peripheral seal on the poppet prevents any fluid from contacting the engaged surfaces of the piston and poppet.

Accordingly, it is a primary object of the present invention to provide an improved dry break coupling valve.

A further object of the invention is to provide a dry break coupling including housings coded for connection to one another.

A further object of the invention is to provide a dry break coupling which eliminates leakage due to the coupling and uncoupling thereof.

A further object of the invention is to provide a dry break coupling wherein the valves of the respective housings are automatically secured in the closed positions therefor in response to disconnection of the coupling housings and vice versa.

A further object of the invention is to provide a dry break coupling including means for securing the piston by lock and key in both the closed and open positions therefor.

A related object is to provide a dry break coupling including means for closing the open end of the poppet housing by lock and key when the coupling housings are disconnected.

Finally, it is an object of the invention to provide a dry break coupling which is durable in use, simple in construction and efficient in operation.

BRIEF DESCRIPTION OF THE DRAWINGS

FIG. 1 is a perspective view of the dry break coupling in assembly relation with a pair of fluid conduits;

FIG. 2 is an enlarged end view of one housing taken along line 2—2 in FIG. 1;

FIG. 3 is a side sectional view taken along angled line 3—3 in FIG. 2;

FIG. 4 is an end view of the piston housing as seen on line 4—4 in FIG. 3;

FIG. 5 is an end sectional view taken along line 5—5 in FIG. 3 and showing the interlock ring;

DESCRIPTION OF THE PREFERRED EMBODIMENT

Figure 6:
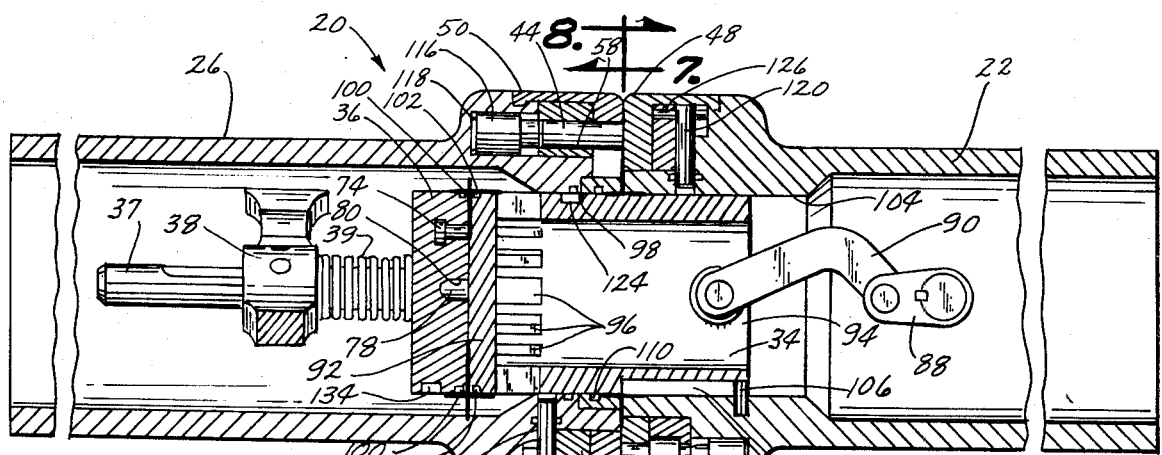
FIG. 6 is a side sectional view, similar to FIG. 3, but showing the housings engaged and the poppet housing rotated 45° relative to its position in FIG. 3.
Figure 7:
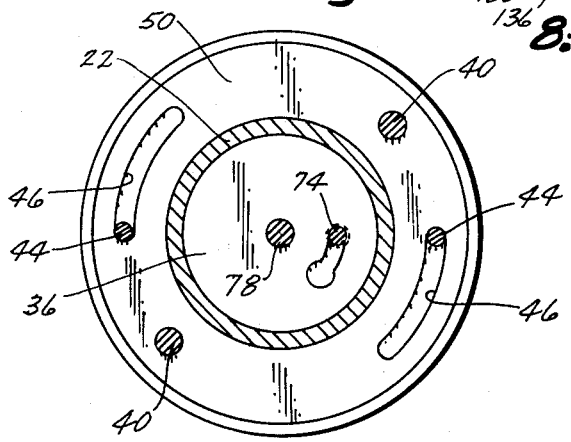
FIG. 7 is a partially sectional end view of the poppet housing taken along line 7—7 in FIG. 6.
Figure 8:
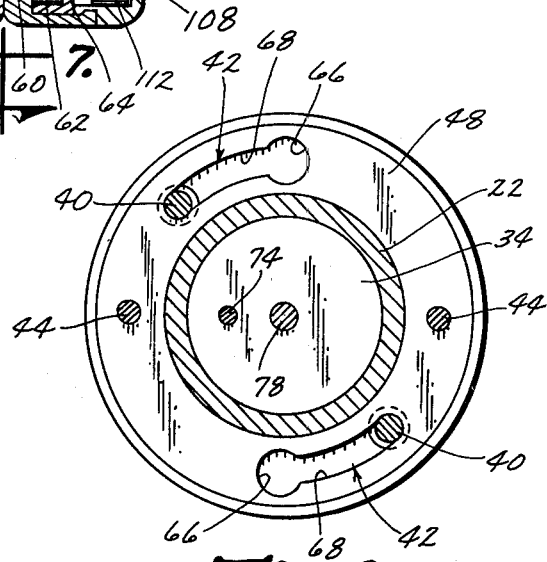
FIG. 8 is a partially sectional end view of the piston housing taken along 8—8 in FIG. 6.

The dry break coupling 20 of the present invention is shown in FIG. 1 as including a first housing 22 connected to a first fluid conduit 24 and a second housing 26 connected to a second fluid conduit 28. The first and second housings have respective open end portions 30 and 32 adapted for engagement with one another for fluid flow between the housings.

The first housing 22 includes a piston 34 which is supported for axial sliding movement between a first retracted position, as shown in FIG. 3, wherein fluid flow through the first housing is blocked and a second advanced position, as shown in FIG. 6, wherein fluid is free to flow through the first housing 22. Likewise, the second housing 26 includes a poppet 36 supported for movement between the first position of FIG. 3 wherein fluid flow through the second housing is blocked and the second position of FIG. 6 wherein fluid is free to flow through the second housing 26. Poppet 36 has a stem 37 slidably carried in a sleeve support 38. A compression spring 39 biases poppet 36 to the first or closed position therefor.

First and second housings 22 and 26 are provided with a coacting pin and slot connector means including a pair of coding pins 40 (FIGS. 2 and 3) axially extended from the second housing 26 and a pair of circumferentially extended slots 42 (FIGS. 3 and 4) positioned on the first housing 22 to axially receive the coding pins 40. Likewise, the first housing 22 has a pair of straight pins 44 (FIGS. 3 and 4) axially extended therefrom for receipt within coacting slots 46 (FIGS. 2 and 3) on the second housing 26.

It can be seen in FIG. 3 that the pin and slot connector means are supported on or formed in first and second cover rings 48 and 50 which are snap-locked onto the first and second housings respectively in press-fit relation thereon. The cover rings thus remain stationary relative to the respective housings onto which they are fit. First and second interlock rings 52 and 54 are rotatably supported on the first and second housings between the respective cover rings and housings. The first interlock ring 52 includes a pair of interlock ring openings 56 which coact with the slots 42 for receiving the coding pins 40. Likewise, the second interlock ring 54 includes a pair of openings 58 adapted to cooperate with slots 46 for receiving the straight pins 44.

The infinite possibilities for varying the construction and arrangement of pins and slots enables the first and second housings 22 and 26 to be matched for a coded connection to one another. Specifically, referring to FIG. 3, it is seen that coding pin 40 includes a stem portion 60, a head portion 62 of greater width than the stem portion, and an extension portion 64 axially extended from the head portion 62 and having a width less than that of the head portion. Referring now to FIG. 4, it is seen that each slot 42 includes an enlarged opening 66 of sufficient dimension to axially receive the head portion 62 and a reduced tail portion 68 having a width substantially equal to that of stem portion 60 for blocking the axial withdrawal of head portion 62 when the stem portion 60 is disposed therein as explained below. Likewise, each opening 56 in the first interlock ring 52 includes an external portion 70 adapted to receive head portion 62 and an internal portion 72 adapted to receive the extension portion 64 of coding pin 40. Since the widths and depths of slot 42 and the external and internal portions of interlock ring opening 56 are substantially equal to the respective widths and depths of the stem portion 60, head portion 62 and extension portion 64 of coding pin 40, the pins and slots are thereby coded for connection to one another. Likewise, the second cover ring slots 46 and second interlock openings 58 are formed of a width and depth for axially receiving the straight pins 44 in close fit relation therein. The first and second housings are further matched for coded connection to one another by the pins and slots being radially and circumferentially arranged on the housings in aligned pairs.

Besides the above-described coacting pin and slot connections between the first and second cover rings 48 and 50, it is seen in FIGS. 2–4 that piston 34 includes a pin 74 axially extended therefrom for receipt within a circumferentially extended slot 76 on poppet 36. Pin 74 is generally T-shaped in cross section and slot 76 has a generally key hole shape for axially retaining the pin within the slot in response to circumferential movement of the pin 74 in slot 76. Piston 34 also has a center pin 78 adapted for receipt within a center opening 80 in poppet 36 to maintain the piston and poppet in axial alignment.

To couple the first and second housings 22 and 26 together, they are aligned as shown in FIGS. 1–5 and moved axially into engagement with one another. Note that the open end portion 30 of first housing 22 includes a male end portion as at 82 and that the open end portion 32 of second housing 26 includes a female end portion as at 84 for receiving male end portion 82 in mating engagement therein. Thus the housings are maintained in axial alignment. Simultaneously, the coding pins 40, straight pins 44 and piston pin 74 are axially received within their respective slots. In order to then secure the housings in axial engagement, they are twisted relative to one another. For example, first housing 22 may be held stationary and second housing 26 may be pivoted 45° clockwise when viewed in the direction of FIG. 2, which is counter-clockwise when viewed in the direction of FIG. 4.

The resulting engaged housings are shown in FIGS. 6–9. Note that the coding pins 40, straight pins 44 and piston pin 74 are all circumferentially moved to the opposite ends of their respective slots. Head portions 62 of coding pins 40 thus secure the first and second housings in axial engagement and piston pin 74 secures the piston 34 in engagement against the poppet 36.

Figure 9:
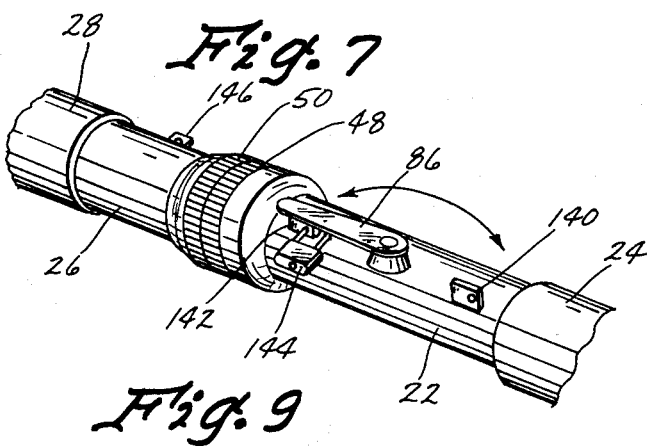
FIG. 9 is a perspective view of the coupled housings.

At this point, the valves are opened by pivoting extension handle 86 on first housing 22 to the position of FIG. 9. Accordingly, an internal crank arm 88 is pivoted 180° to advance linkage 90 for moving the piston 34 and poppet 36 in unison from the first or closed positions of FIG. 3 to the second or open positions of FIG. 6.

Piston 34 is an elongated tubular member, preferably cylindrical, and has a closed outer end 92 and an open inner end 94 in communication with fluid in first conduit 24. A plurality of circumferentially spaced openings or slots 96 are formed through the piston adjacent the outer end 92 for fluid flow through the slots 96 and piston 34 when the piston is in its open position. Referring to FIG. 6, it is seen that fluid may flow from second conduit 28 into second housing 26, around poppet 36 and into piston slots 96 for flow through the tubular piston 34, first housing 22 and into first conduit 24 or vice versa.

When the piston 34 and poppet 36 are in the open positions of FIG. 6, the cylindrical body of the piston 34 covers the annular joint 98 between the open end portions 30 and 32 of the housings to shield the joint from the fluid flowing between the housings. Likewise, poppet 36 is provided with a seal ring 100 carried in a peripheral channel thereon and engageable with piston 34 to prevent the entrance of fluid between them. In addition, piston 34 carries a peripheral wiper seal ring 102 which cleans the interior surfaces of the open end portions 30 and 32 of both housings as the piston is retracted to its first or closed position of FIG. 3. Accordingly, no fluid residue is ever deposited on either the open end portions 30 and 32 or the engaged faces of the piston and poppet. Therefore, upon disconnection of the first and second housings, a clean dry break is made with no leakage of fluid.

It is seen in FIG. 6 that first housing 22 defines a cylindrical sleeve 104 within which piston 34 is slidably supported in both the first and second positions therefor. Pivotal movement of piston 34 within sleeve 104 is prevented by a key 106 engaged within an axial slot 108 in the periphery of the piston. An additional seal ring 110 is supported in the sleeve adjacent the outer end thereof.

In order to disconnect the coupled housings, second housing 26 is pivoted in the opposite direction back to the position of FIG. 3 whereupon the head portions 62 of coding pins 40 are aligned with the enlarged openings 66 of slots 42 and piston pin 74 is moved to the opposite end of the poppet slot 76 so that the first housing may be axially withdrawn from the second housing. It is seen in FIG. 3 that as each coding pin 40 is withdrawn from the interlock ring opening 56, a keeper pin 112 is biased by a compression spring 114 into the opening to maintain the same in an aligned position for receiving the coding pin when the housings are to be coupled together again. Likewise, the rotatable second interlock ring 54 is maintained in an aligned position by keeper pins 116 biased into openings 58 by springs 118 upon withdrawal of the straight pins 44.

For purposes of both safety and economy, it is important that the piston and poppet not be opened when the first and second housings are disconnected. For this purpose, the present invention affords a dual system of protection including both automatic and manual locking systems. The automatic system can be seen best with reference to FIGS. 3 and 5. A first stop pin 120 is slidably supported in a radially extended socket 122 in first interlock ring 52. Piston 34 has a peripheral opening 124 which is positioned for registration with socket 122 for receiving one end of stop pin 120 when the piston is in its first or closed position. Stop pin 120 is automatically secured against withdrawal from the piston opening 124 by a cam means including a cam pin 126 connected to stop pin 120 and slidably received in a circumferentially extended cam slot 128 in the first interlock ring 52. Note that the opposite ends of cam slots 128 are radially offset relative to one another so that stop pin 120 is slidably moved within socket 122 in response to pivotal movement of first interlock ring 52 relative to first housing 22. Such pivotal movement occurs of course when coding pins 40 are engaged within the interlock ring openings 56 and pivoted to couple the first and second housings together. Accordingly, first stop pin 120 automatically engages the piston 34 in response to uncoupling of the housings and is automatically disengaged from the piston in response to coupling of the housings.

An identical system is provided for the poppet 36 including a second stop pin 130 slidably received within a socket 132 for engagement within a peripheral opening 134 in the poppet when a cam pin 136 is radially moved in response to pivotal movement of a cam slot 138 in the second interlock ring 54.

It should be noted that stop pins 120 and 130 also perform a disengagement lock out function, namely to prevent uncoupling of the first and second housings while the valve is open. In FIG. 6, it can be seen that the piston opening 124 and poppet opening 134, which receive the first and second stop pins 120 and 130 respectively, are axially offset from the respective stop pins when the piston 34 and poppet 36 are in their second or open positions. As a result, any pivotal movement between the housings in a direction to uncouple the housings causes both pins 120 and 130 to abut against the periphery of cylindrical piston 34, thereby arresting further pivotal movement until the valve is closed. Therefore, the coupling cannot be disconnected when the valve is open.

Figure 10:
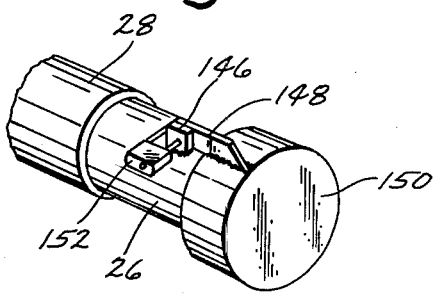
FIG. 10 is a perspective view of the poppet housing with a cap secured thereon by lock and key.

Referring to FIGS. 9 and 10, the manual locking system includes longitudinally spaced apart brackets 140 and 142 on first housing 22, the brackets being positioned for securing extension handle 86 by a padlock 144 in either the open or closed position therefor. A similar bracket 146 is secured on the second housing 26 for engagement with an elongated flange 148 on a generally cup-shaped cap 150 to secure the cap by a padlock 152 in position over the open end portion 32 of the second housing.

Accordingly, there has been shown a dry break coupling capable of connection and disconnection with no fluid loss therefrom. The separable housings are matched for coded connection to one another and both automatic and manual systems are provided for preventing opening of the respective valves within the housings except when the housings are properly coupled together.

We claim:

1. An apparatus for coupling together and uncoupling a pair of fluid conduits comprising a first housing adapted for connection to one fluid conduit, a second housing adapted for connection to the other fluid conduit, said first and second housings having respective open end portions adapted for engagement with one another for fluid flow between said housings, coacting connector means on said first and second housings operative to couple said housings together in response to relative rotary movement between said engaged open end portions in one direction and operative to uncouple said housings in response to relative rotary movement between said engaged open end portions in the opposite direction, said first housing including a piston supported for axial sliding movement therein between a first position wherein fluid flow through said first housing is blocked and a second position wherein fluid is free to flow through said first housing, said second housing including a poppet supported for axial movement therein between a first position wherein fluid flow through said second housing is blocked and a second position wherein fluid is free to flow through said second housing, coacting stop means on said second housing and poppet, said coacting stop means being engageable when said poppet is in the first position therefor to fix the poppet in said first position, each respective housing including means engageable by said respective end portions and responsive to said relative rotary movement in said one direction for engaging said coacting stop means and responsive to said relative rotary movement in said opposite direction for disengaging said coacting stop means.

2. The apparatus of claim 1 wherein said coacting stop means comprises a stop pin slidably supported in a radially extended socket in said second housing, and a peripheral opening in said poppet positioned for registration with said socket for receiving one end of said stop pin when said poppet is in the first position therefor.

3. The apparatus of claim 1 wherein said coacting stop means are axially spaced apart so as to be incapable of registration when said poppet is in the second position therefor, said means for engaging and disengaging said coacting stop means being operative to prevent relative rotary movement in said engaged open end portions in said opposite direction when the poppet is in the second position therefor whereby said housings cannot be uncoupled when the poppet is in the second position.

4. An apparatus for coupling together and uncoupling a pair of fluid conduits comprising a first housing adapted for connection to one fluid conduit, a second housing adapted for connection to the other fluid conduit, said first and second housings having respective open end portions adapted for engagement with one another for fluid flow between said housings, first and second valve means on said first and second housings respectively for closing and opening said respective open end portions, and coacting pin and slot connector means on said first and second housings including a pin axially extended from one of said housings, said other housing having a slot positioned to axially receive said pin, said slot being circumferentially extended for limited circumferential movement of said pin within said slot, and means responsive to circumferential movement of said pin in said slot for axially securing said open end portions of said housings in engagement with one another, said pin including a stem portion and a head portion of greater width than said stem portion, said slot including an enlarged opening of sufficient dimensions to axially receive said head portion and a reduced tail portion having a width less than the width of said head portion for blocking the axial withdrawal of said head portion when said stem portion is disposed within the tail portion of the slot, said open end portion of one housing comprising annular ring means including an external cover ring and an internal interlock ring, said slot being formed in said cover ring and said interlock ring having an opening adapted to receive said head portion of the pin, said pin further comprising an extension portion axially extended from said head portion and said opening in the interlock ring including an external portion adapted to receive said head portion and an internal portion adapted to receive said extension portion, the depths of said slot and external and internal portions of said opening being substantially equal to the respective depths of said stem portion, head portion and extension portion of said pin whereby said pin and slot are coded for connection to one another, and said interlock ring being rotatably supported between said cover ring and housing and rotatable when said pin is circumferentially moved, said opening in the interlock ring being of a size to receive said head portion in close fit relation therein.

5. The apparatus of claim 4 wherein said interlock ring opening is registrable with said enlarged opening in said cover ring for axial withdrawal of the pin from said slot, and further comprising keeper means for maintaining said interlock ring opening in said registered position when said pin is absent from said interlock ring opening.

6. The apparatus of claim 5 wherein said keeper means comprises a keeper pin supported on said housing in alignment with said enlarged opening and further comprising means for biasing said keeper pin against said interlock ring whereby said keeper pin is moved into said interlock ring opening when the interlock ring is in said registered position therefor.

7. The apparatus of claim 4 further comprising first stop means for retaining said first valve means in a closed position and means for disengaging said first stop means in response to relative pivotal movement between said housings corresponding to said circumferential movement of said pin in said slot.

8. The apparatus of claim 7 wherein said first stop means comprises a stop pin slidably supported in a radially extended socket in said interlock ring, said first valve means having a peripheral opening positioned for registration with said socket for receiving one end of said stop pin when said first valve means is in the closed position therefor.

9. The apparatus of claim 8 wherein said means for disengaging said first stop means comprises coacting cam means on said stop pin and first housing.

10. An apparatus for coupling together and uncoupling a pair of fluid conduits comprising a first housing adapted for connection to one fluid conduit, a second housing adapted for connection to the other fluid conduit, said first and second housings having respective open end portions adapted for engagement with one another for fluid flow between said housings, coacting connector means on said first and second housings operative to couple said housings together in response to relative rotary movement between said engaged open end portions in one direction and operative to uncouple said housings in response to relative rotary movement between said engaged open end portions in the opposite direction, said first housing including a piston supported for axial sliding movement therein between a first position wherein fluid flow through said first housing is blocked and a second position wherein fluid is free to flow through said first housing, said second housing including a poppet supported for axial movement therein between a first position wherein fluid flow through said second housing is blocked and a second position wherein fluid is free to flow through said second housing, coacting stop means on said second housing and poppet, said coacting stop means being engageable when said poppet is in the first position therefor to fix the poppet in said first position, means for engaging said coacting stop means in response to said relative rotary movement between said engaged open end portions in said opposite direction and for disengaging said coacting stop means in response to said relative rotary movement in said one direction, said coacting stop means comprising a stop pin slidably supported in a radially extended socket in said second housing, and a peripheral opening in said poppet positioned for registration with said socket for receiving one end of said stop pin when said poppet is in the first position therefor, said first housing including a pin axially extended therefrom and said second housing including an annular ring rotatably supported on the open end portion thereof, said annular ring having an opening adapted to receive said pin when the open end portion of said first and second housings are engaged whereby said annular ring is rotatable by said pin in unison with said first housing relative to said second housing, said means for engaging and disengaging said coacting stop means comprising coacting cam means on said stop pin and annular ring for moving said stop pin within said socket in response to pivotal movement of said first housing relative to said second housing.

11. The apparatus of claim 10 wherein said coacting cam means includes a generally circumferentially extended cam slot in said annular ring, said slot having ends radially offset relative to one another, and a cam pin connected to said stop pin and slidably received in said cam slot whereby said stop pin is slidably moved into and out of said peripheral opening in the poppet in response to pivotal movement of said annular ring on said housing.

12. The apparatus of claim 10 wherein said second housing includes an external cover ring on the open end portion thereof for rotatably supporting said annular ring between said external cover ring and open end portion, said cover ring having a circumferentially extended slot for limited circumferential movement of said pin within said slot.

* * * * *